(12) United States Patent
Wang et al.

(10) Patent No.: US 8,751,054 B2
(45) Date of Patent: Jun. 10, 2014

(54) ENERGY PREDICTION SYSTEM

(75) Inventors: Yanzhi Wang, Los Angeles, CA (US); Sachin G. Deshpande, Camas, WA (US); Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 127 days.

(21) Appl. No.: 13/224,708

(22) Filed: Sep. 2, 2011

(65) Prior Publication Data

US 2013/0060392 A1    Mar. 7, 2013

(51) Int. Cl.
*G01R 21/00* (2006.01)
*G05B 13/00* (2006.01)
*G05D 9/00* (2006.01)
*G06F 17/00* (2006.01)

(52) U.S. Cl.
USPC ........... 700/291; 700/276; 700/286; 700/295; 700/296; 700/297; 702/61; 705/412

(58) Field of Classification Search
USPC ................. 700/276, 286, 291, 295, 296, 297; 702/61; 705/412
See application file for complete search history.

(56) References Cited

U.S. PATENT DOCUMENTS

| | | | |
|---|---|---|---|
| 5,274,571 A * | 12/1993 | Hesse et al. | 700/291 |
| 6,185,483 B1 * | 2/2001 | Drees | 700/295 |
| 7,058,522 B2 | 6/2006 | Chen | |
| 7,085,660 B2 * | 8/2006 | Mansingh et al. | 702/60 |
| 2006/0206240 A1 * | 9/2006 | Tsui | 700/291 |
| 2007/0222636 A1 * | 9/2007 | Iwamura | 340/870.01 |

(Continued)

FOREIGN PATENT DOCUMENTS

| | | |
|---|---|---|
| GB | 2448896 B | 5/2009 |
| JP | 2008-077561 A | 4/2008 |
| JP | 2009-252940 A | 10/2009 |
| JP | 2010-249608 A | 11/2010 |

OTHER PUBLICATIONS

Wang, Yanzhi, et al. "A Hierarchical Control Algorithm for Managing Electrical Energy Storage Systems in Homes Equipped with PV Power Generation". Proc. of the IEEE Green Technologies Conference. Apr. 20, 2012. Tulsa, OK. IEEE. 1-6. Print.*

(Continued)

*Primary Examiner* — Mohammad Ali
*Assistant Examiner* — Jennifer L Norton
(74) *Attorney, Agent, or Firm* — Chernoff Vilhauer McClung & Stenzel, LLP

(57) ABSTRACT

An energy management system includes a controller receiving electrical pricing information from an electrical utility company, measuring electrical power usage of a customer, and providing the electrical power usage to the electrical utility company. The controller is suitable to receive information regarding energy storage of a customer's electrical power storage and receive power information regarding a power generation source of the customer. The controller modifies the power usage of the energy management system based upon the pricing information, the electrical power usage, the energy storage, the power information, wherein the pricing information includes a plurality of temporal pricing levels and a temporal peak pricing level.

10 Claims, 4 Drawing Sheets

(56) References Cited

U.S. PATENT DOCUMENTS

| | | | |
|---|---|---|---|
| 2007/0276547 A1* | 11/2007 | Miller | 700/295 |
| 2010/0076613 A1* | 3/2010 | Imes | 700/287 |
| 2010/0174418 A1* | 7/2010 | Haugh | 700/295 |
| 2010/0198420 A1 | 8/2010 | Rettger et al. | |
| 2011/0231320 A1* | 9/2011 | Irving | 705/80 |
| 2012/0059775 A1* | 3/2012 | Oh et al. | 705/412 |
| 2013/0096728 A1* | 4/2013 | Steffes et al. | 700/291 |
| 2013/0190939 A1* | 7/2013 | Lenox | 700/291 |
| 2013/0261826 A1* | 10/2013 | Mandagere et al. | 700/291 |
| 2013/0297089 A1* | 11/2013 | Fu et al. | 700/295 |
| 2013/0325198 A1* | 12/2013 | Mansfield | 700/291 |

OTHER PUBLICATIONS

Li Wei et al., "Short-term power Load Forecasting using Improved Ant Colony Clustering," WKDD, 2008, pp. 221-224.

Chen et al., "Energy Prediction Based on Resident's Activity," SensorKDD'10, 2010, 7 pgs.

Hiyama et al., "Neural Network Based Estimation of Maximum Power Generation from PV Module Using Environmental Information," IEEE Trans. on Energy Conversion, 1997, pp. 241-247.

Zhou et al., "Composite Energy Storage System Using Dynamic Energy Management in Microgrid Applications," IPEC, 2010, pp. 11631168.

\* cited by examiner

ENERGY PREDICTION SYSTEM

CROSS-REFERENCE TO RELATED APPLICATIONS

None.

BACKGROUND OF THE INVENTION

The present invention relates to an energy management system.

Increasing energy demands over time from factories, businesses, and homes has significantly increased the demands on the available energy resources. The available energy sources are, at times, reaching their limits to provide energy to their customers on a consistent and reliable basis.

To reduce the energy consumption, programmable thermostats permit users to program their heating and cooling systems to reduce the consumption during times when they are not home or otherwise it is not necessary. To further reduce the energy consumption, automatic timers permit users to program their lights so that they are only turned on when they are needed. Thus, various programmable devices are used to attempt to reduce the energy consumption or shift the time of use of energy.

In many cases, the users of energy have chosen to add electrical power generation sources, and in some cases the ability to store the energy generated for later usage. Such power generation sources, include for example, wind generators, water based generators, geothermal based generators, and photovoltaic panels. By monitoring the available energy from such power generation sources and predicting energy demands, the power usage may be modified in a suitable manner.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
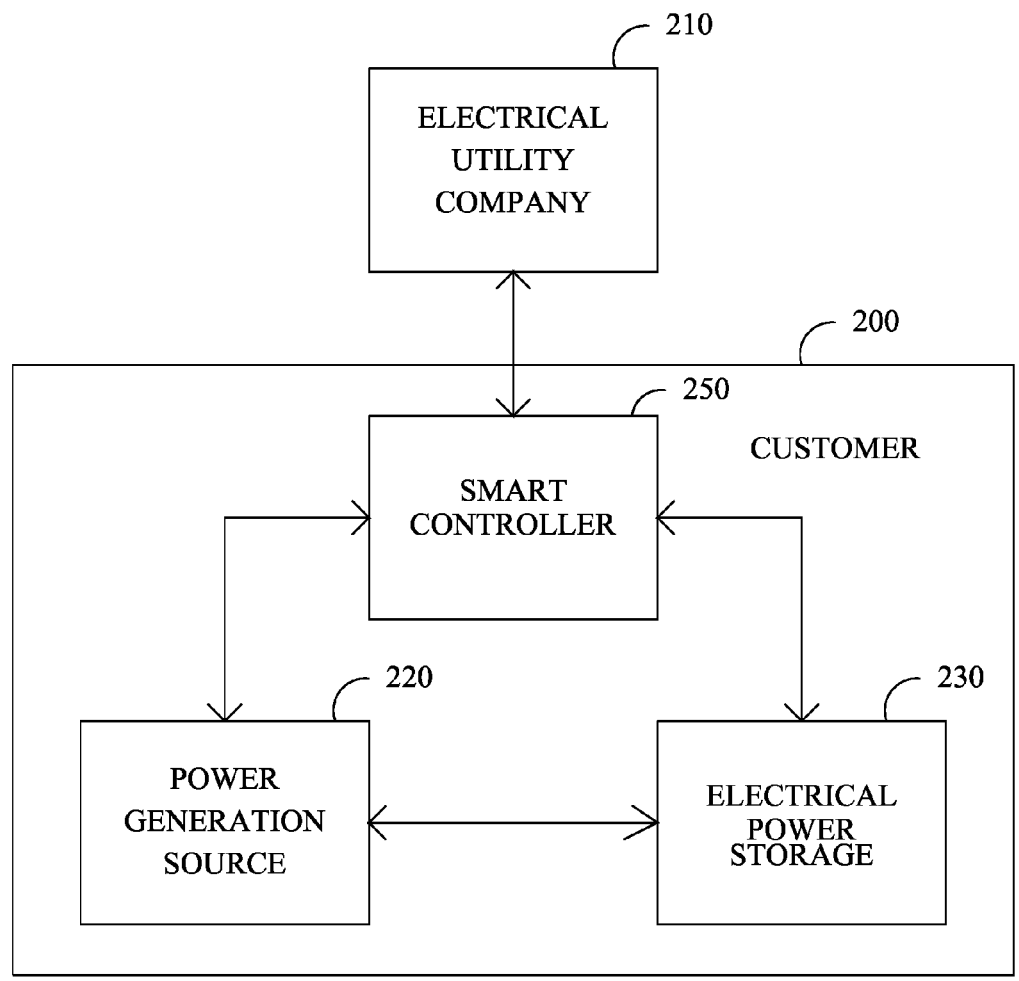
FIG. 1 illustrates a power prediction system.

Referring to FIG. 1, an electricity customer 200 purchases his electrical energy needs from an electrical utility company 210. Often the customer 200 has their own power generation source 220, such as a photovoltaic panel, a wind turbine, a gas generator, etc. In addition to the power generation source 220, the customer 200 often has their own electrical power storage 230, such as a battery or a set of capacitors. Electrical power generated by the power generation source 220 may be contemporaneously used by the customer 200, stored in the electrical power storage 230 for future use, and/or otherwise provided back to the electrical utility company 210 which tends to result in a credit or otherwise an offset on their utility bill from the electrical utility company 210. In some cases, the customer 200 may store power from the electrical utility company 210 in the electrical power storage 230.

The customer 200 may use a smart controller 250 to provide two-way communication between the customer 200 and the electrical utility company 210. In general, the smart controller 250 may record the consumption of electrical energy in intervals, such as an hour or less, and reports that information on a regular basis (e.g., such as daily) back to the utility for monitoring and billing purposes. In this manner, the smart controller may gather data for remote reporting. In many cases, the smart controller 250 may also provide power outage notification and power quality monitoring. The smart controller 250 also enables the customer 200 to more accurately estimate their bills and to manage their energy usage. In addition to providing overall power usage, the smart controller 250 may likewise include and/or receive electrical pricing information from the electrical utility company 210. The pricing information may include, for example, monthly pricing, weekly pricing, day of the week pricing, and/or time of day based pricing.

Figure 2:
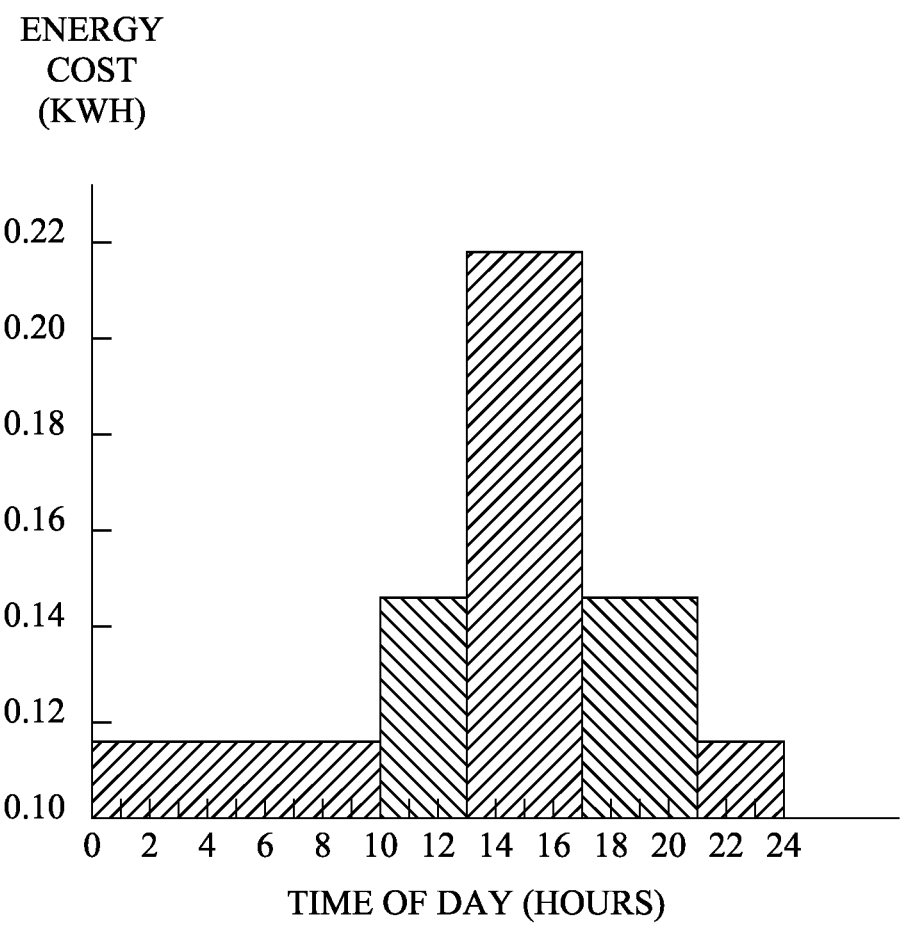
FIG. 2 illustrates a temporal billing system.

Referring to FIG. 2, in some cases, the utility company charges a different rate depending on the time of the day that the electrical energy is used. For example, during the middle of the day the electrical rates tend to be higher (since the demand tends to be higher) than the rates during the middle of the night (since the demand tends to be lower). The smart controller 250 in response to its available inputs, such as the pricing information for the time of the day, the current time of day, the anticipated electrical power usage of the customer 200, and/or the electrical power storage 230 available, may determine where to obtain the desired electrical power. The smart controller 250 may obtain electrical power form the electrical utility company 210 and/or a power generation source 220 and/or an electrical power storage 230.

Figure 3:
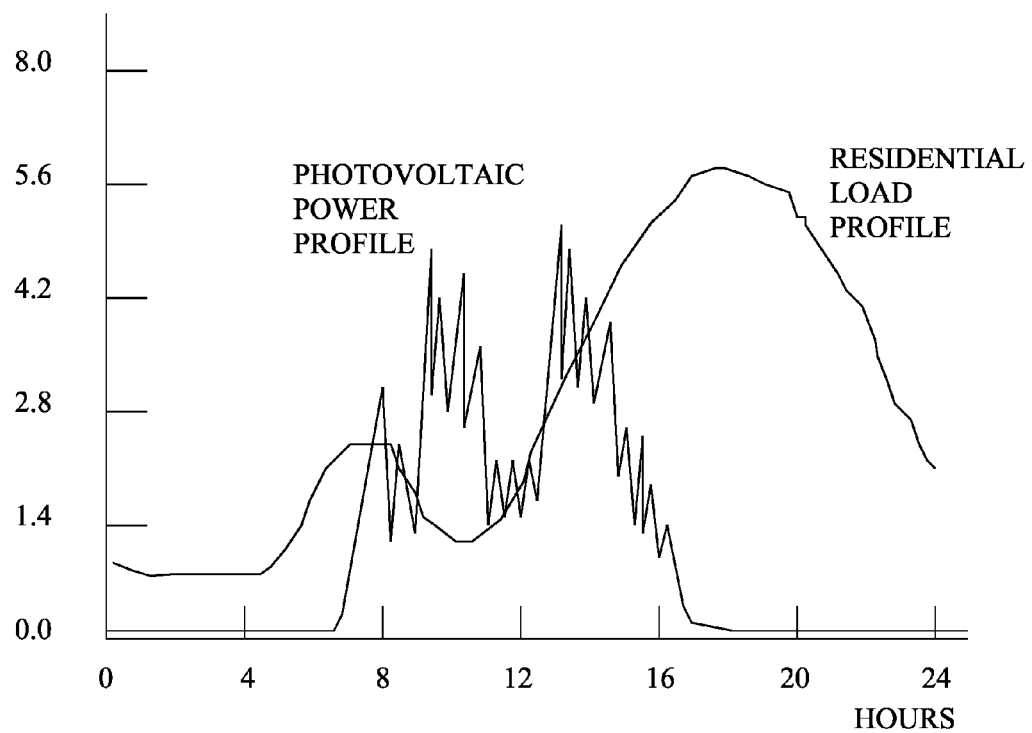
FIG. 3 illustrates a photovoltaic output profile and a residential load profile.

Referring to FIG. 3, a typical residential/customer load profile for a day is illustrated overlaid on a typical photovoltaic power source generation for a day, such as a solar panel. As it may be observed, during the middle of the day the photovoltaic power source tends to provide most of its energy, while in the night hours the photovoltaic power source tends to provide no significant energy. Similarly as it may be observed, during the middle of the day the residence tends to use a medium amount of power, but tends to have its maximum power usage toward the ends of the day after the photovoltaic power source tends to provide no significant energy. Accordingly, the time period of the maximum power being provided by the photovoltaic power source and the time period of the maximum power being used by the residence are not substantially aligned with one another.

One technique to provide additional power not provided by the electrical utility company 210 during the peak power usage of the customer is to store electrical energy from the photovoltaic power source 220 and/or the electrical utility company 210 in the electrical power storage 230. The smart controller 250 also is able to track or otherwise determine the amount of energy available in the electrical power storage 230. In this manner, the smart controller 250 may control the storage of surplus photovoltaic power (e.g., during the daytime), and subsequently provide power for the customer's usage when there is no or limited photovoltaic power (e.g., during the evening). In addition, the smart controller 250 may store electric power from utility when the price is low (e.g., early in the day and on weekends) and provide power for the customer's usage when the price is high (e.g., middle of the day and weekdays). By managing the storage and anticipated usage of electrical energy, the smart controller 250 can reduce the overall cost of the electrical power of power from the electrical utility company 210.

Referring again to FIG. 2, the pricing function may primarily consist of two parts, a usage price and a monthly peak price. The usage price is based upon the amount of energy used in combination with the price of that energy based upon the time of day and/or the day of the week. The monthly peak price is based upon a maximum amount of energy drawn from the utility during a particular period of time, which sometimes may need to persist for a sufficient period of time so that short spikes in energy usage are not identified as the maximum for a particular time period. Accordingly, the smart controller 250 should take into account not only the overall anticipated power usage of the customer based upon the time of day and/or day of the week, but also the likely maximum power usage during one or more time periods, in a manner to reduce the overall cost of electrical energy to the customer.

One technique to determine the power usage of the customer is to profile the anticipated photovoltaic power (or other power source) and to profile the anticipated load power of the customer. The anticipated photovoltaic power and the anticipated load power may be separately profiled, if desired. By predicting them separately (e.g., one is not based upon the other) the system may provide improved results because each has a different characteristic. The net load power used by the customer may be based upon the difference between the electrical power usage and the photovoltaic power generation together with any power provided by the electrical power storage.

The prediction of the load requirements for an entire day tends to require a relatively complicated characterization. Similarly, the prediction of the photovoltaic power for an entire day tends to require a relatively complicated characterization. Moreover, predicting the peak load and its timing likewise tends to be relatively complicated. Also, predicting the peak photovoltaic power and its timing likewise tends to be relatively complicated.

A preferred prediction technique for the load and the photovoltaic power is to predict the peak and average for different periods of each day. The different periods of each day should be in a manner consistent with the temporal pricing model of the electrical utility company. For example, with five different pricing periods during a day, the predictions may include a corresponding set of five different predictions. The prediction technique may include both an estimated peak load power prediction and an estimated peak photovoltaic power prediction consisting of an initial prediction and an intra-day refinement that is applied as the day progresses.

Figure 4:
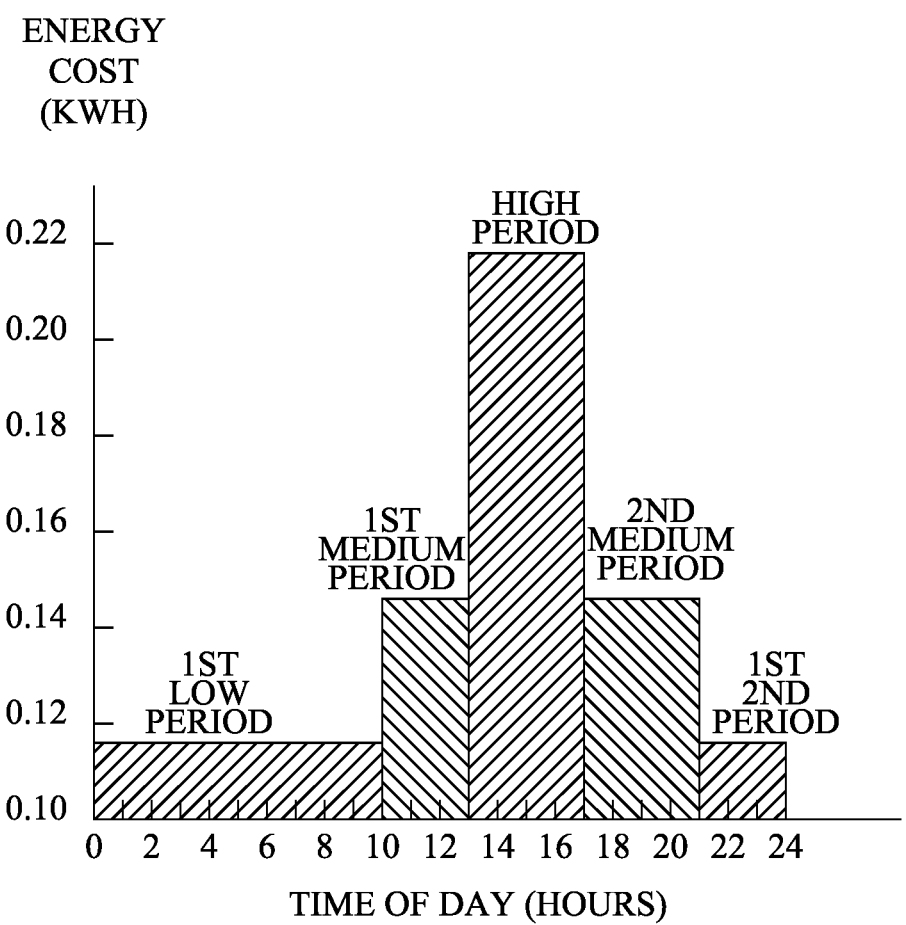
FIG. 4 illustrates another temporal billing system.

Referring to FIG. 4 as an example, consider the peak prediction in the i-th day in a month. The initial prediction for the load or power source stands for the prediction performed at time 0:00 of the i-th day for predicting the peak load (or photovoltaic source) power in a $1^{st}$ low period, a $1^{st}$ medium period, a high period, a $2^{nd}$ medium period, and a $2^{nd}$ low period of the i-th day. On the other hand, the intra-day refinement of the peak power prediction may be performed at time 10:00 of the i-th day (the end of the $1^{st}$ low period), to refine the initial prediction results of the peak power in the other time periods (the $1^{st}$ medium period, the high period, the $2^{nd}$ medium period, and the $2^{nd}$ low period). Since the actual peak power in the $1^{st}$ low period of the i-th day is known it may be used for determining a more accurate prediction of the future time periods. Similarly, the intra day refinement may also be performed at the time 13:00 (the end of the $1^{st}$ medium period) of the i-th day to refine the initial preduction results in the high period, the $2^{nd}$ medium period, and the $2^{nd}$ low period of the same day. It may also be performed at the time 17:00 (the end of the high period) and 20:00 (the end of the $2^{nd}$ medium period) to refine the prediction results of the remaining time periods of the day. In this manner, the data of one time period may be used to refine the prediction of future time periods.

One suitable prediction technique is to use an adaptive regression based process. For example, presume the system is predicting the peak load power in the high period of the i-th day, then the prediction may be as follows:

$$\text{Predict}_{HP,i} = \langle \alpha_{HP,i}, \text{Feature\_Vector}_{HP,i} \rangle$$

in which $\text{Predict}_{HP,i}$ is the predicted peak load power in the high period of the i-th day, and the feature vector is given by $$\text{Feature\_Vector}_{HP,i} = [\text{Actual}_{HP,i-1}, \text{Actual}_{HP,i-2}, \text{Actual}_{HP,i-7}, \text{Actual}_{HP,i-14}, \text{Actual}_{HP,i-21}, 1]$$

which implies that the system uses the actual peak load powers in the high periods of a previous day, a second previous day, a same day a week before, a same day two weeks before, and a same day three weeks before as features. Moreover, the parameter vector $\alpha_{HP,i}$ may be updated as follows using a least mean squares function:

$$\alpha_{HP,i+1} \leftarrow \alpha_{HP,i} + \alpha \cdot (\text{Actual}_{HP,i} - \text{Predict}_{HP,i}) \cdot \text{Feature\_Vector}_{HP,i}$$

An intra-day refinement process may be as follows. The system computes an intra-day refinement at 10:00 of the i-th day as an example, in which the i-th day may be any day in a month (or a year). At that time the actual peak load power in the $1^{st}$ low period is available. Suppose the system is going to refine the initial prediction result of the peak load power in the high period of the i-th day. The result of the refinement may be characterized as $\text{Refine}_{HP,i}$, which may be calculated as:

$$\text{Refine}_{HP,i} \leftarrow (1-\gamma) \cdot \text{Predict}_{HP,i} + \gamma \cdot (\text{Actual}_{MP,i}/\text{Predict}_{MP,i}) \cdot \text{Predict}_{HP,i}.$$

It is desirable not to underestimate the amount of energy required from the electrical power storage 230 and/or power generation source 220 so that the available power in storage 230 does not run out or otherwise become to low resulting in a spike in the maximum power used from the electrical utility company 210. This helps reduce the cost of purchasing the energy from the electrical utility company by reducing peak load and thus peak charge. One technique that may be used to reduce the likelihood of underestimating of peak load power is to modify the intra-day refinement technique to include a correction factor $k_{load} > 1$.

$$\text{Refine}_{HP,i} \leftarrow \text{Refine}_{HP,i} \cdot k_{load}, \text{ if } \text{Refine}_{HP,i} > \text{Predict}_{HP,i}.$$

This modification reduces the likelihood of underestimating of peak load power in the high period of the i-th day when $\text{Refine}_{HP,i} > \text{Predict}_{HP,i}$. This technique may likewise be applied to the other time periods, as desired. Similar technique is used for prediction of low period and medium period peaks.

The peak photovoltaic power over a specific time period, such as one of the billing time periods of a day ($1^{st}$ lower period, $1^{st}$ medium period, high period, $2^{nd}$ medium period, $2^{nd}$ low period) may be characterized as the sunny day peak photovoltaic power over that period multiplied by a decay factor, representing the effect of clouds. Therefore for each day, the system may use the initial prediction, performed at the beginning of day, mainly to predict the sunny day peak photovoltaic power over each time period of that day. In that manner the system may use the intra-day refinement, performed at time 10:00 (the end of the $1^{st}$ low period), to predict the decay factors (and subsequently predict the actual peak photovoltaic powers) of the remaining time periods ($1^{st}$ medium period, high period, $2^{nd}$ medium period, $2^{nd}$ low period) of that day, since the decay factor of the $1^{st}$ low period is already accessible when the intra-day refinement is performed (at 10:00 AM).

The photovoltaic initial power prediction may use any suitable technique, such as an exponential average-based prediction, for predicting the sunny day peak photovoltaic power in each time period. The system may derive the prediction value of the sunny day peak photovoltaic power in the high period of the i-th day, denoted by $\text{Predict}_{HP,i}$, based on the prediction of sunny day peak photovoltaic power in the high period of the (i−1)-th day, denoted by $\text{Predict}_{HP,i-1}$, and the actual peak photovoltaic power in the high period of the (i−1)-th day, denoted by $\text{Actual}_{HP,i-1}$. The $\text{Predict}_{HP,i}$ value may be calculated as follows:

$$\text{Predict}_{HP,i} = (1-\alpha(\text{Predict}_{HP,i-1}, \text{Actual}_{HP,i-1})) \cdot \text{Predict}_{HP,i-1} \cdot \alpha(\text{Predict}_{HP,i-1}, \text{Actual}_{HP,i-1}) \cdot \text{Actual}_{HP,i-1}$$

As indicated above $\alpha(\text{Predict}_{HP,i-1}, \text{Actual}_{HP,i-1})$ may be equal to, 1 if $\text{Predict}_{HP,i-1} < \text{Actual}_{HP,i-1}$ $e^{-\beta \cdot (\text{Predict } HP, i-1, \text{Actual } HP, i-1)}$, otherwise The photovoltaic intra-day refinement may be as follows. The system may take the intra-day refinement at 10:00 of the i-th day as an example, in which the i-th day may be any day in a month (or a year). At that time the actual peak photovoltaic power in the $1^{st}$ low period is available. The initial prediction result of the peak photovoltaic power in the high period of the i-th day may be refined. The system may characterize the refinement as $\text{Refine}_{HP,i}$, which may be calculated as:

$$\text{Refine}_{HP,i} \leftarrow (1-\gamma) \cdot \text{Predict}_{HP,i} + \gamma \cdot (\text{Actual}_{MP,i}/\text{Predict}_{MP,i}) \cdot \text{Predict}_{HP,i}.$$

It is desirable not to overestimate the peak (or average) photovoltaic power so that the available power from storage 230 does not run out or otherwise become to low resulting in a spike in the maximum power used from the electrical utility company 210. This helps reduce the cost of purchasing the energy from the electrical utility company. One technique that may be used to reduce the likelihood of overestimating of peak photovoltaic power is to modify the intra-day refinement technique to include an additional correction factor $k_{pv} < 1$.

$$\text{Refine}_{HP,i} \leftarrow \text{Refine}_{HP,i} \cdot kpv, \text{ if } \text{Refine}_{HP,i} > \text{Predict}_{HP,i}.$$

This modification reduces the likelihood of overestimating the peak photovoltaic power in the high period of the i-th day when $\text{Refine}_{HP,i} < \text{Predict}_{HP,i}$. This technique may likewise be applied to the other time periods, as desired.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An energy management system comprising:
   (a) a controller receiving electrical pricing information from a remotely located electrical utility company, said controller measuring electrical power usage of a customer, and said controller providing said electrical power usage to said remotely located electrical utility company;
   (b) said controller suitable to receive information regarding energy storage of a customer's electrical power storage;
   (c) said controller suitable to receive power information regarding a power generation source of said customer that: generates electricity which is separate and apart from power provided to said customer by said electrical utility;
   (d) said controller modifying the power usage of said energy management system based upon said pricing information, a prediction of said electrical power usage during each of a plurality of sequential days, said energy storage, said power information, wherein said pricing information includes a plurality of temporal pricing levels and a temporal peak pricing level, where said prediction of said electrical power usage during a one of said plurality of sequential days is refined during said one of said plurality of sequential days, where said modification is based upon a prediction of electrical power generation from said power generation source during each of said plurality of sequential days, and wherein said prediction of electrical power generation includes a prediction of peak power generation during said day.

2. The energy management system of claim 1 wherein said pricing information includes said plurality of temporal pricing levels for different time periods of a day for energy usage and said temporal peak pricing level for at one of said time periods of said day.

3. The energy management system of claim 1 wherein said pricing information includes at least one of monthly pricing, weekly pricing, and day of the week pricing.

4. The energy management system of claim 2 wherein said plurality of pricing levels includes at least three different pricing levels.

5. The energy management system of claim 1 wherein said controller modifies said energy usage in a manner so as to reduce said temporal peak pricing level.

6. The energy management system of claim 1 wherein said modification is based upon a prediction of temporal power storage during said each of a plurality of sequential days.

7. The energy management system of claim 1 wherein said prediction is updated during one of said plurality of sequential days.

8. The energy management system of claim 7 wherein said prediction of electrical power generation and said prediction of electrical power usage are not dependent on one another.

9. The energy management system of claim 1 wherein said prediction of electrical power usage is based upon a model having a plurality of segments.

10. The energy management system of claim 1 wherein said prediction of electrical power usage is a prediction of peak power usage during said day.

* * * * *